Patented Dec. 18, 1928.

1,695,445

UNITED STATES PATENT OFFICE.

HOWARD F. WEISS, OF MADISON, WISCONSIN, ASSIGNOR, BY MESNE ASSIGNMENTS, TO WOOD CONVERSION COMPANY, OF CLOQUET, MINNESOTA, A CORPORATION OF DELAWARE.

FOOD PRODUCT.

No Drawing. Application filed April 20, 1918. Serial No. 229,760.

This invention relates to an improved food product which is obtainable from the waste wood of the western larch. The food product is of a carbohydrate character and may be prepared in various forms.

In the hydrolysis of wood waste, by means of dilute sulfuric acid and steam, it has been found that the wood of the western larch not only gives a higher percentage of sugars than most, if at all, other woods, but that the sugars obtained are of a characteristic composition. Most coniferous woods, upon acid hydrolysis of the wood yield, around 20 to 22% of sugar, but in the case of the western larch, the yield has been found to amount to as high as 29.5%.

The increased sugar yield obtainable from the western larch, however, has been found to be due largely to the hydrolysis of the galactan content of the larch, the galactan being converted into galactose. Galactose is of a different composition and has different properties from the other sugars produced by hydrolysis of the wood substance itself.

The different properties and characteristics of the galactose present in the sugars from the western larch are indicated in various ways. Thus, in the fermentation of the sugar solution obtained, the galactose has been found to be very resistant to fermentation by the usual ferments, so that the yield of alcohol obtainable does not correspond to the total sugar content of the fermented liquor.

The sugar product obtainable from the western larch is nevertheless of increased value as a food product, because of this same galactose content which makes it less adapted for fermentation purposes. Because of the greater resistance of the galactose itself to fermentation, the sugar product containing the galactose is made more resistant to fermentation. Food products made with this sugar product are, accordingly, of improved keeping properties and resistance to deterioration by fermentation especially when diluted than are food products made from sugars derived from other woods where the galactose is not present or is present in inappreciable amounts.

A further advantage of the galactose content of the food product is due to the fact that the galactose is a product which is further along in the digestive metabolism than are certain other sugars, such as milk sugar. Milk sugar which is one of the best food products known, splits during the digestive process into two other sugars,—galactose and glucose. The improved food product of the present invention, which contains considerable amounts of galactose may, accordingly, be considered as of a partly predigested character, or of a character better adapted for assimilation during the digestive metabolism.

The food product of the present invention may be prepared in various forms, and in admixture with various other compositions. The composite sugar product obtained from the wood of the western larch, after the hydrolysis thereof with acids, should usually be neutralized to remove any objectionable excess of acid, and also treated for the removal of any other constituents which may be objectionable, such as tannin if present in objectionable amounts.

The product of hydrolysis will contain the composite sugar product, together with the wood residue and such impurities as may result from the hydrolysis operation. In general, the sugar product will be extracted from the wood residue, purified to the desired extent, and concentrated into a concentrated sugar product which may be combined with various other materials to give a composite product.

The process of producing the improved food product will be further illustrated by the following example:

The larch wood, preferably in the form of saw mill or woods refuse, is shredded into fine particles and then dumped into digesters. A weak solution of sulfuric acid (about 25% of the weight of the dry wood) is then poured into the digester or otherwise mixed with the wood. Steam is then admitted under a pressure not greater than about 120 pounds per square inch, and this pressure is maintained for a period of time usually not exceeding 10 minutes. The action of the acid and steam brings about hydrolysis of the galactan in the wood, and hydrolysis of a part of the wood itself, with resulting production therefrom of a composite sugar product containing both the galactose derived from the galactan, and the other sugars derived from the wood substance itself. Steam is then blown from the digester and the hydrolyzed wood is extracted, preferably in a series of diffusion cells. This extraction removes from the wood residue the sugars and other soluble materials which it contains. The resulting solution is then neutralized with a suitable neutralizing agent such as lime, with the production of gypsum or calcium sulfate which may be filtered off. The solutions may be further purified to remove other objectionable constituents, and are then evaporated to a thick syrup or molasses which is well adapted for use as a food product, particularly as stock food.

The thick syrup or molasses thus obtained will be of a composite character, containing the galactose and other sugars, and will be a valuable food product because of its content of these sugars. The galactose, as above pointed out, is less susceptible to fermentation, and is readily assimilated, so that its effect is beneficial both in protecting the product from fermentation, and in supplying to the product a valuable food constituent which is readily assimilated.

The syrup or molasses may be compounded with various other materials including the hydrolyzed wood residue itself and other stock foods which will serve to give, with the sugar product, a balanced ration. The syrup may thus be combined with cereal foods or with oil cake, alfalfa or other material, and particularly materials which will supply albuminous or protein constituents, and preferably also fatty constituents. Oil cake is thus well adapted for combining with the composite sugar product.

The syrup or molasses may moreover be absorbed in a finely pulverulent absorbent material which will make the product partake of a solid or semi-solid product, and which may also itself be of an edible character.

It will be evident that the galactose content of the composite sugar product derived from larch will amount to a very considerable proportion of the total sugars present. In general, the galactose content will be considerably above 5% of the total sugar content, and may amount to 25% or more of the total sugar present, if larch particularly rich in galactan is used.

I claim:

1. A stock food comprising the composite sugar products of hydrolysis of western larch wood including galactose, in a concentrated state.

2. A stock food comprising the composite sugar products of hydrolysis of western larch wood, including galactose, in a concentrated state and in admixture with finely divided hydrolyzed larch wood residue.

In testimony whereof I affix my signature.

HOWARD F. WEISS.